(12) United States Patent
Jagadeesh et al.

(10) Patent No.: US 12,718,377 B2
(45) Date of Patent: Aug. 25, 2026

(54) PREPROCESSING FOR IMAGE SEGMENTATION

(71) Applicant: Apple Inc., Cupertino, CA (US)

(72) Inventors: Vignesh Jagadeesh, Saratoga, CA (US); Lee A. Morgan, Santa Clara, CA (US); Rohan Chandra, San Francisco, CA (US); Shujie Liu, San Jose, CA (US); Yann Lifchitz, Zurich (CH)

(73) Assignee: Apple Inc., Cupertino, CA (US)

( * ) Notice: Subject to any disclaimer, the term of this patent is extended or adjusted under 35 U.S.C. 154(b) by 374 days.

(21) Appl. No.: 18/508,174

(22) Filed: Nov. 13, 2023

(65) Prior Publication Data

US 2024/0404069 A1 Dec. 5, 2024

Related U.S. Application Data

(60) Provisional application No. 63/470,978, filed on Jun. 5, 2023, provisional application No. 63/470,828, filed on Jun. 2, 2023.

(51) Int. Cl.

*G06T 7/12* (2017.01)
*G06F 3/0482* (2013.01)
*G06T 13/80* (2011.01)
*G06V 10/764* (2022.01)

(52) U.S. Cl.

CPC .............. *G06T 7/12* (2017.01); *G06F 3/0482* (2013.01); *G06T 13/80* (2013.01); *G06V 10/764* (2022.01)

(58) Field of Classification Search

CPC ......... G06T 7/12; G06T 13/80; G06V 10/764; G06F 3/0482
USPC .......................................................... 382/173
See application file for complete search history.

(56) References Cited

U.S. PATENT DOCUMENTS 10,445,585 B1 * 10/2019 Ludden .................. G06V 20/41
11,055,566 B1 * 7/2021 Pham ................... G06V 10/771
11,789,913 B2 * 10/2023 Mahowald ............. G06F 30/20 707/803
11,880,429 B1 * 1/2024 Saraee .................... G06F 18/22
11,928,184 B2 * 3/2024 Friman ................. G06F 18/214
2017/0139573 A1 * 5/2017 Li ........................ G06F 3/04845
2021/0124987 A1 * 4/2021 Gan ....................... G06V 20/41
2022/0035727 A1 * 2/2022 Scott, II ................. G16H 40/40
2022/0092521 A1 * 3/2022 Hunter .................. G06F 40/205
2022/0366494 A1 * 11/2022 Cella ...................... G06N 3/006
2023/0192418 A1 * 6/2023 Horowitz ............... B65G 47/46 198/349
2024/0202986 A1 * 6/2024 Singh ..................... G06V 20/30
2024/0290118 A1 * 8/2024 Bellaccini ............. G06V 20/70

* cited by examiner

*Primary Examiner* — William D Titcomb
(74) *Attorney, Agent, or Firm* — BAKERHOSTETLER

(57) ABSTRACT

Aspects of the subject technology provide techniques for improved re-use of digital images, including creation of a new "sticker" image by extracting one or more objects from a prior image. In an implementation, images in a library may be preprocessed to identify image attributes of corresponding images in the library, including suitability scores, classifications of objects in the images, and masks for the classified objects.

20 Claims, 3 Drawing Sheets

100

CAMERA
EMAIL
WEB PAGES
OTHER
IMAGE LIBRARY 106
102
104

200

IMAGE LIBRARY 106
USER INPUT
PREPROCESSOR 204
IMAGE
OBJECT LIFTING SCORES
MASKS
CLASSIF-ICATIONS
210
OBJECT-LIFTING SELECTION UI 208
EXTRACTED-OBJECT IMAGE
206

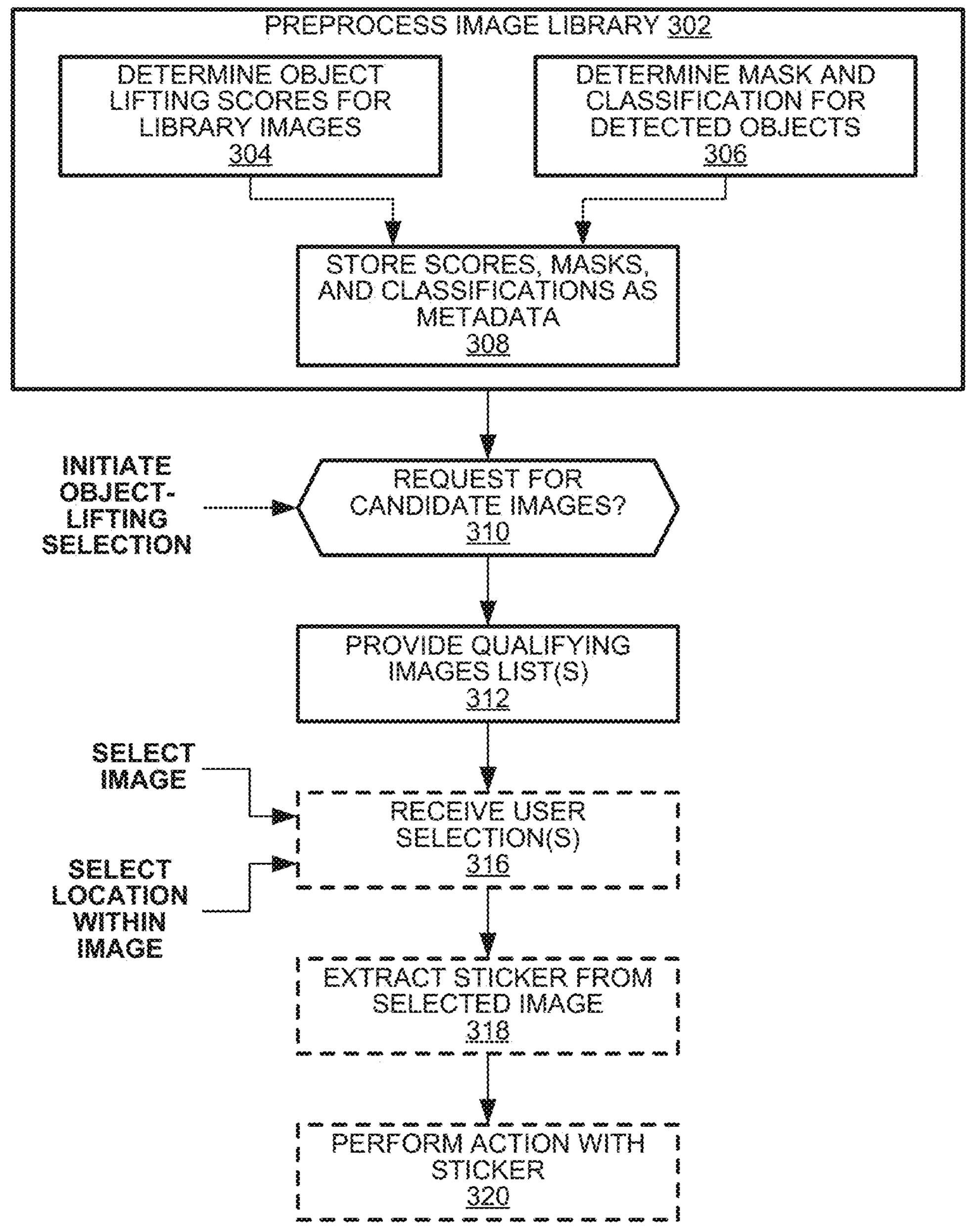
FIG. 3
300
PREPROCESS IMAGE LIBRARY 302
DETERMINE OBJECT LIFTING SCORES FOR LIBRARY IMAGES 304
DETERMINE MASK AND CLASSIFICATION FOR DETECTED OBJECTS 306
STORE SCORES, MASKS, AND CLASSIFICATIONS AS METADATA 308
INITIATE OBJECT-LIFTING SELECTION
REQUEST FOR CANDIDATE IMAGES? 310
PROVIDE QUALIFYING IMAGES LIST(S) 312
SELECT IMAGE
SELECT LOCATION WITHIN IMAGE
RECEIVE USER SELECTION(S) 316
EXTRACT STICKER FROM SELECTED IMAGE 318
PERFORM ACTION WITH STICKER 320

PREPROCESSING FOR IMAGE SEGMENTATION

CROSS-REFERENCE TO RELATED APPLICATION(S)

The present application claims the benefit of U.S. Provisional Application No. 63/470,978, entitled "Preprocessing for Image Segmentation," filed Jun. 5, 2023, and claims the benefit of U.S. Provisional Application No. 63/470,828, entitled "Preprocessing for Image Segmentation," filed Jun. 2, 2023, the disclosure of each of which is hereby incorporated herein in its entirety.

TECHNICAL FIELD

The present description relates generally to digital image processing systems.

BACKGROUND

Modern personal devices often include a digital camera, and many device users collect libraries of photos. A large library may be challenging to navigate, and re-use of a selected photo in the library may require extensive processing or customization of the image.

BRIEF DESCRIPTION OF THE DRAWINGS

Certain features of the subject technology are set forth in the appended claims. However, for purpose of explanation, several implementations of the subject technology are set forth in the following figures.

FIG. 3 illustrates an example process for image processing according to aspects of the subject technology.

DETAILED DESCRIPTION

Figure 1:
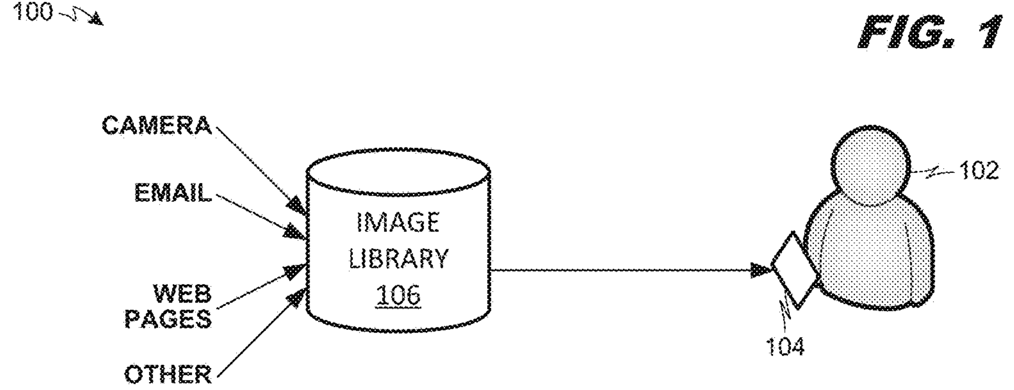
FIG. 1 illustrates an example environment in which aspects of the subject technology may be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Techniques are provided for improved re-use of digital images, including creation of a new image by extracting one or more objects from a prior image. Preprocessing images may allow for an improved process for user selection of candidate images from a library of images, and to improve selection of a portion of a candidate image for re-use. In an implementation, images in a library may be preprocessed to identify image attributes of corresponding images in the library, including suitability scores, classifications of objects in the images, and/or masks for the classified objects. Image attributes may be stored as metadata and later used to determine a list of library images that are qualified for re-use. A suitability score may rate an individual image's potential as a source for creating a new image of an object extracted and/or segmented from the source image. The process of extracting an object from an image may be referred to as "lifting" the object from the image, and the resulting extracted object image may be used, for example, as a "sticker" image.

By preprocessing images to determine a combination of preprocessed image attributes, processes for user selection and/or creation of extracted-object images may be simplified. For example, the combination of a preprocessed lifting suitability score with object classifications and masks may simplify user discovery and selection of images suitable for object lifting from (a potentially large) library of source images, and then may also simplify the creation of an extracted-object image from the selected source image. In response to a request for candidate images, a user interface may present a list of images in the library with high lifting suitability scores (and not present images in the library with lower lifting suitability scores). A lifting suitability score of a candidate image may indicate a likelihood that one or more objects can be extracted from the candidate image and result in a high quality extracted-object image. By preprocessing the lifting suitability score, the list may be presented quickly without the need to process images in the library on demand. Preprocessed object classifications may allow such a user interface to provide one or more lists of images containing objects of a certain classification that also have a high lifting suitability score. In response to selection of a particular candidate image, an extracted-object image may be created efficiently by applying a mask previously produced by preprocessing to the selected candidate image.

The resulting extracted-object images may have a variety of uses. For example, multiple extracted-object images may be combined to create new images, extracted-object images may be used as sticker images that are applied to (composited with) another image in the library, extracted-object images may be used in messaging (for example as emoticons), or an extracted-object image my simply stored for later use.

In some implementations, a video library may include "live" images that include an associated video (e.g., a short video), and preprocessing may produce animated suitability scores. A list of qualifying images may be determined based on the animated suitability score. An animated suitability score of live images may indicate a likelihood that a high-quality animated sticker can be extracted from the image. In an aspect, a live image may include both an associated video and a primary still image (which may be a still image extracted from the video), and the preprocessing may produce both an animated suitability score for the associated video and a still suitability score for the corresponding primary still image. A live image's primary still image may be used as a candidate library image as described above. In another aspect, preprocessing may produce a combined suitability score for a live image based on a combination of the animated suitability score and the still suitability score. In yet another aspect, the preprocessing may determine a time mask for the associated videos, and the time mask may be used to extract a time subset of an associated video as an animated sticker. A time mask may indicate a subset portion of the associated video best suited as an animated sticker.

In an aspect of some implementation, an "object" that may be extracted or otherwise "listed" from a library image is not limited to a single object. In these aspects, references to an "object" herein may refer to a more general subject of the image, where a subject may include a plurality of physical objects, a subset portion of a physical object, or any other element of a library image that may be distinguished from other elements of the library image by a mask of the library image. In this aspect, a "object lifting suitability score" may be a subject lifting score, an "object mask" may be a subject mask, etc.

FIG. 1 illustrates an example environment 100 in which aspects of the subject technology may be implemented. Environment 100 includes a user 102 and a device 104. Device 104 may store, or provide remote access to, an image library 106 which may be composed of images from one or more sources, such as a camera on device 104, emails with image attachments, web pages, etc. Device 104 may include a user interface to allow user 102 to select an image from amongst images in image library 106 that is suitable as a source of a sticker image, and the user interface may further allow the user to identify which area or object in a selected image should be used as source for a sticker image.

Figure 2:
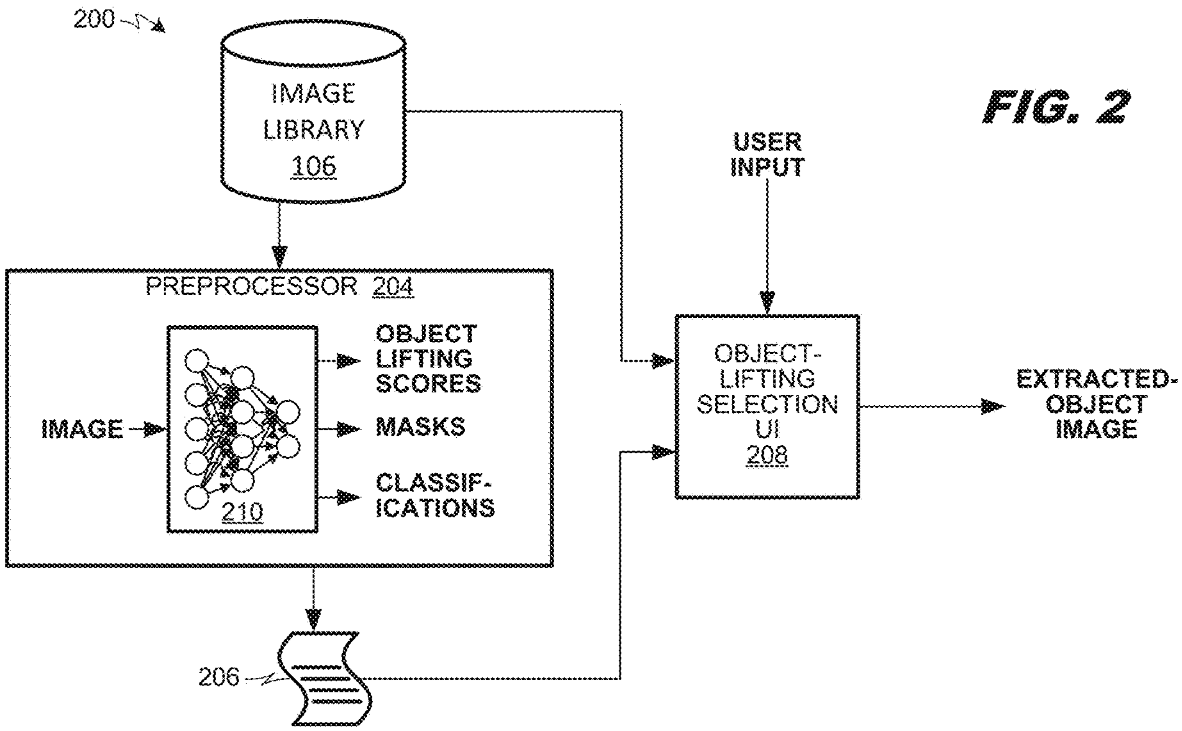
FIG. 2 illustrates an example image processing system according to aspects of the subject technology.

FIG. 2 illustrates an example image processing system 200 according to aspects of the subject technology. System 200 may be implemented, for example on device 104 (FIG. 1). System 200 includes image library 106, a preprocessor 204, metadata 206 and an object-lifting selection user interface (UI) 208. In operation, preprocessor 204 may preprocess images in the image library 106 to determine image attributes for corresponding images in the image library prior to operation of object-lifting selection UI 208. The determined image attributes may be stored as metadata 206 for later use by object-lifting selection UI 208. Object-lifting selection UI 208 may enable a user to select a source image from the image library based on metadata 206 of images in the library (such as image attributes, objects contained in the image, suitability scores, etc.), may allow a user to select an object within a source image, and/or may cause the creation of a extracted-object image from a selected source image for the selected object.

In an aspect of some implementations, preprocessor may include one or more machine learning models 210, and one or more of the image attributes determined by preprocessor 204 maybe generated by analyzing images from image library 106 with the one or more machine learning models 210. The one or more machine learning models 210 may be trained to detect and/or classify different types of objects in the images, such as people, animals, and the like. For example, a first machine learning model may accept an image as input and output a predicted object lifting suitability score that may be interpreted, for example, as probability that the input image contains a salient object. This first machine learning model may be trained, for example, on a diverse dataset of comprising positive samples (images containing salient objects) and negative samples (images not containing salient objects). In a second example machine learning, model, a classification may be output as a label or tag from a fixed taxonomy in response to an input image.

In some aspects, multiple objects may be detected in a single library image, and the multiple detected objects for a single image may be separately classified (such as classified as different object types). In these aspects, an extracted-object image may be created that include one or more of the multiple objects detected. In an aspect, user input may indicate which of multiple detected objects are to be extracted. For example, the user input may include an indication of a selected location within a selected image, and the selected location may be used to distinguish between multiple detected objects.

The metadata 206 produced by preprocessor 204 may include, for example, object lifting suitability scores, masks for objects detected in the image, and/or classifications of the detected objects, one or more of which may be provided as outputs of the one or more aforementioned machine learning models. Object classifications may include, for example an object type (such as a person or dog) and/or a characterization of the object (such as moving or static, happy or sad), and each object may include a plurality of classifications (e.g., an object may be classified as a happy, moving, person).

In aspects not depicted in FIG. 2, one or more of image library 106, preprocessor 204, object-lifting selection UI 208, and metadata 206 may be implemented remotely from each other. For example, object-lifting selection UI 208 may be implemented on a device such as device 104 (FIG. 1), while image library, preprocessor 204, and metadata 206 may be implemented at one or more remote servers, such as part of a cloud computing service. In these aspects, remote components may interact via a computer network, such as the Internet. In another aspect, metadata 206 of images may be stored in image library 106.

FIG. 3 illustrates an example process 300 for image processing according to aspects of the subject technology. Process 300 may be implemented, for example, on device 104 (FIG. 1) or on system 200 (FIG. 2). Process 300 includes preprocessing images from an image library (302) which may include determining object lifting suitability scores for corresponding images in the library (304), determining one or more masks for one or more detected objects in library images and determining one or more classifications for the one or more detected objects (306), and storing the scores, masks, and classifications as metadata attributes of corresponding library images (308). When a request for candidate source images is received (310), for example as a request to initiate an object-lifting selection user interface (310), one or more lists of qualifying images may be provided based the stored metadata. The qualifying lists may be presented, for example by an object-lifting selection user interface.

In an aspect, preprocessing the image library (302), including storing the determined metadata (302), may be performed before a request for candidate images is received (310). This may allow the qualifying image to be quickly provided based on the metadata and may require the use of few computing resources after receiving the request.

In some aspects, preprocessing the image library (302) may also include detecting objects in the images, and a mask may be identified for the detected objects. A mask may have a variety of possible representations. For example, a mask may include a binary image indicating, for each pixel in the image, whether the pixel is part of the object or not. In another example, a mask may be provided as an alpha channel for the image specifying a blending parameter per pixel. The blending parameters in the alpha channel may represent a proportion between object and non-object for each pixel. In yet another example, a mask may indicate as boundary contour of an object within the image, for example as a spline that follows the edge of the object within the image.

The one or more qualifying lists provided (312) may include a list composed of a subset of images in the image library, and the lists may be determined based on one or more of the image attributes stored in as metadata. For example, a qualifying image list may be a list of all images in the library that qualify as a source for an extracted-object image. Such a qualifying image list may be determined as the list of images in the image library with an object lifting score above a qualifying threshold, or such a qualifying image list may be a list of a predetermined length of the images with the highest object lifting score (e.g., a list of images in the library with the top 20 object lifting scores).

In one aspect, an object lifting suitability score may indicate if a corresponding image includes an object that is suitable for extraction. For example, an object lifting suitability score may indicate a quality of a corresponding object mask, or a confidence rating in a corresponding object mask. In another example, an object lifting suitability score may indicate a visual quality of one or more detected objects within the corresponding image, such as a degree to which a detected object is in focus in the corresponding image or another measure of the image quality of the object within the corresponding image.

In other aspects, qualifying image lists may be based on classifications of objects detected in the images. For example, a qualifying image list may include all images having a specified classification attribute, such as all images that include animals, all images that include people, all people with a happy facial expression, etc. In yet another aspect, a qualifying image list may be determined based multiple metadata attributes. For example, a qualifying image list may be based on both an object lifting score and an object classification, such as list including only images with both a detected objects classified as a dog and also have an object lifting score above a threshold.

In some implementations, lists of qualifying images may be determined during preprocessing, and stored as image library metadata. In these implementations, one or more qualifying image lists may be provided (312) without having to build the list(s) after receiving a request for candidate images (310).

Some optional aspects of process 300 include receiving one or more user selection(s) (316), extracting an extracted-object from an image (318), and performing an action with the extracted-object image. In an aspect, the received user selection(s) may include a user's selection of an image in the library from a qualifying image list. In another aspect, the received user selection(s) may include a selection of a location within a library image. A selected location within an image may be used to differentiate between multiple detected objects in a single library image. The sticker image extracted from a selected library image (318) may be based on the selected location within the library image.

In some aspects, actions performed with the sticker image (320) might include, for example, presenting the sticker image to a user via a user interface, or storing the sticker image for later use.

Figure 4:
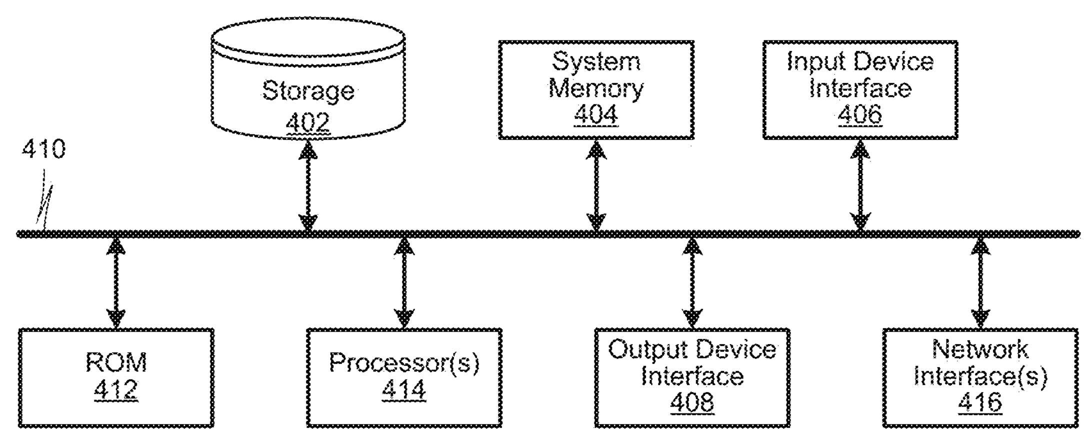
FIG. 4 illustrates an example computing device with which aspects of the subject technology may be implemented.

FIG. 4 illustrates an example computing device 400 with which aspects of the subject technology may be implemented in accordance with one or more implementations, including, for example system 200 (FIG. 2) and process 300 (FIG. 3). The computing device 400 can be, and/or can be a part of, any computing device or server for generating the features and processes described above, including but not limited to a laptop computer, a smartphone, a tablet device, a wearable device such as a goggles or glasses, an earbud or other audio device, a case for an audio device, and the like. The computing device 400 may include various types of computer readable media and interfaces for various other types of computer readable media. The computing device 400 includes a permanent storage device 402, a system memory 404 (and/or buffer), an input device interface 406, an output device interface 408, a bus 410, a ROM 412, one or more processing unit(s) 414, one or more network interface(s) 416, and/or subsets and variations thereof.

The bus 410 collectively represents all system, peripheral, and chipset buses that communicatively connect the numerous internal devices of the computing device 400. In one or more implementations, the bus 410 communicatively connects the one or more processing unit(s) 414 with the ROM 412, the system memory 404, and the permanent storage device 402. From these various memory units, the one or more processing unit(s) 414 retrieves instructions to execute and data to process in order to execute the processes of the subject disclosure. The one or more processing unit(s) 414 can be a single processor or a multi-core processor in different implementations.

The ROM 412 stores static data and instructions that are needed by the one or more processing unit(s) 414 and other modules of the computing device 400. The permanent storage device 402, on the other hand, may be a read-and-write memory device. The permanent storage device 402 may be a non-volatile memory unit that stores instructions and data even when the computing device 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random-access memory. The system memory 404 may store any of the instructions and data that one or more processing unit(s) 414 may need at runtime. In one or more implementations, the processes of the subject disclosure are stored in the system memory 404, the permanent storage device 402, and/or the ROM 412. From these various memory units, the one or more processing unit(s) 414 retrieves instructions to execute and data to process in order to execute the processes of one or more implementations.

The bus 410 also connects to the input and output device interfaces 406 and 408. The input device interface 406 enables a user to communicate information and select commands to the computing device 400. Input devices that may be used with the input device interface 406 may include, for example, alphanumeric keyboards and pointing devices (also called "cursor control devices"). The output device interface 408 may enable, for example, the display of images generated by computing device 400. Output devices that may be used with the output device interface 408 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 410 also couples the computing device 400 to one or more networks and/or to one or more network nodes through the one or more network interface(s) 416. In this manner, the computing device 400 can be a part of a network of computers (such as a LAN, a wide area network ("WAN"), or an Intranet, or a network of networks, such as the Internet. Any or all components of the computing device 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

preprocessing a plurality of images to determine, for each respective image in the plurality of images, an object lifting suitability score and a plurality of object masks with corresponding object classifications for a plurality of automatically detected objects in the respective image, each object mask corresponding to a detected object in the respective image;

storing the object lifting suitability scores and the plurality of object masks with the corresponding object classifications;

in response to a request for candidate images for object lifting:

providing a list of one or more of the plurality of images based on the object lifting suitability scores and the corresponding object classifications; and in response to a first selection of a first image that corresponds to an image from the list and a selected location within the first image, selecting, from the plurality of stored object masks for the first image, an object mask corresponding to the detected object in the first image associated with the selected location.

2. The method of claim 1, wherein the list is further based on a selection of a classification.

3. The method of claim 1, further comprising:

in response to a second selection of a second image in the list, extracting a sticker image based on a second object mask corresponding to the second image; and performing an action based on the sticker image.

4. The method of claim 1, further comprising:

extracting a sticker image from the first image based on the selected object mask; and performing an action based on the sticker image.

5. The method of claim 1, wherein:

images in the plurality of images include associated videos;

the preprocessing further determines an animated lifting suitability score for corresponding images in the plurality of images, and storing the animated lifting suitability scores; and the list is further based on the animated lifting suitability scores.

6. The method of claim 5, wherein the preprocessing further determines a time mask for the associated videos, and the method further comprises:

in response to a second selection of a second image in the list, extracting an animated sticker based on the time mask for the second image; and performing an action based on the animated sticker.

7. The method of claim 1, wherein:

images in the plurality of images include live images comprising a primary still image and an associated video; and the preprocessing determines an animated lifting suitability score for a video associated with a first live image, determines a still lifting suitability score for the primary still image associated with the first live image, and stores the animated lifting suitability score and the still lifting suitability score.

8. A system for audio processing, comprising:

a processor; and a memory storing instructions, that when executed by the processor, cause the system to:

preprocess a plurality of images to determine, for each respective image in the plurality of images, an object lifting suitability score and a plurality of object masks with corresponding object classifications a plurality of automatically detected objects in the respective image, each object mask corresponding to a detected object in the respective image;

store the object lifting suitability scores and the plurality of object masks with the corresponding object classifications;

in response to a request for candidate images for object lifting:

provide a list of one or more of the plurality of images based on the object lifting suitability scores and the corresponding object classifications; and in response to a first selection of a first image that corresponds to an image from the list and a selected location within the first image, select, from the plurality of stored object masks for the first image, an object mask corresponding to the detected object in the first image associated with the selected location.

9. The system of claim 8, wherein the list is further based on a selection of a classification.

10. The system of claim 8, wherein the instructions further cause the system to:

in response to a second selection of a second image in the list, extract a sticker image based on a second object mask corresponding to the second image; and performing an action based on the sticker image.

11. The system of claim 8, wherein the instructions further cause the system to:

extract a sticker image from the first image based the selected object mask; and perform an action based on the sticker image.

12. The system of claim 8, wherein:

images in the plurality of images include associated videos;

the preprocessing further determines an animated lifting suitability score for corresponding images in the plurality of images, and storing the animated lifting suitability scores; and the list is further based on the animated lifting suitability scores.

13. The system of claim 12, wherein the preprocessing further determines a time mask for the associated videos, and the instructions further cause the system to:

in response to a second selection of a second image in the list, extracting an animated sticker based on the time mask for the second image; and performing an action based on the animated sticker.

14. The system of claim 12, wherein:

images in the plurality of images include live images comprising a primary still image and an associated video; and the preprocessing determines an animated lifting suitability score for a video associated with a first live image, determines a still lifting suitability score for the primary still image associated with the first live image, and stores the animated lifting suitability scores and the still lifting suitability score.

15. A non-transitory computer readable memory storing instructions that, when executed by a processor, cause the processor to:

preprocess a plurality of images to determine, for each respective image in the plurality of images, an object lifting suitability score and a plurality of object masks with corresponding object classifications for a plurality of automatically detected objects in the respective image, each object mask corresponding to a detected object in the respective image;

store the object lifting suitability scores and the plurality of object masks with the corresponding object classifications;

in response to a request for candidate images for object lifting:

provide a list of one or more of the plurality of images based on the object lifting suitability scores and the corresponding object classifications; and in response to a first selection of a first image that corresponds to an image from the list and a selected location within the first image, select, from the plurality of stored object masks for the first image, an object mask corresponding to the detected object in the first image associated with the selected location.

16. The computer readable memory of claim 15, wherein the list is further based on a selection of a classification.

17. The computer readable memory of claim 15, wherein the instructions further cause the processor to:

in response to a second selection of a second image in the list, extract a sticker image based on a second object mask corresponding to the second image; and perform an action based on the sticker image.

18. The computer readable memory of claim 15, wherein the instructions further cause the processor to:

extract a sticker image from the first image based the selected object mask; and perform an action based on the sticker image.

19. The computer readable memory of claim 15, wherein:

images in the plurality of images include associated videos;

the preprocessing further determines an animated lifting suitability score for corresponding images in the plurality of images, and storing the animated lifting suitability scores; and the list is further based on the animated lifting suitability scores.

20. The computer readable memory of claim 19, wherein the preprocessing further determines a time mask for the associated videos, and wherein the instructions further cause the processor to:

in response to a second selection of a second image in the list, extract an animated sticker based on the time mask for the second image; and perform an action based on the animated sticker.

* * * * *